United States Patent [19]

Sun

[11] Patent Number: 5,278,417
[45] Date of Patent: Jan. 11, 1994

[54] HIGH ENERGY NEUTRON DOSIMETER

[75] Inventor: Rai Ko S.F. Sun, Albany, Calif.

[73] Assignee: The Regents of the University of California, Oakland, Calif.

[21] Appl. No.: 982,201

[22] Filed: Nov. 25, 1992

[51] Int. Cl.$^5$ ............................................... G01T 3/00
[52] U.S. Cl. ........................ 250/390.03; 250/390.10; 250/392
[58] Field of Search ............ 250/370.05, 390.01, 250/390.02, 390.03, 390.04, 390.07, 392, 390.10

[56] References Cited

U.S. PATENT DOCUMENTS

| | | | |
|---|---|---|---|
| 3,140,397 | 7/1964 | Henry | 250/390.03 X |
| 3,140,398 | 7/1964 | Reinhardt et al. | 250/392 |
| 4,074,136 | 2/1978 | Heinzelmann et al. | 250/390.03 X |

FOREIGN PATENT DOCUMENTS

| | | | |
|---|---|---|---|
| 2-82188 | 3/1990 | Japan | 250/390.01 |
| 3-82985 | 4/1991 | Japan | 250/390.01 |

Primary Examiner—Constantine Hannaher
Assistant Examiner—Edward J. Glick
Attorney, Agent, or Firm—Paul R. Martin; Kathleen S. Moss; Pepi Ross

[57] ABSTRACT

A device for measuring dose equivalents in neutron radiation fields. The device includes nested symmetrical hemispheres (forming spheres) of different neutron moderating materials that allow the measurement of dose equivalents from 0.025 eV to past 1 GeV. The layers of moderating material surround a spherical neutron counter. The neutron counter is connected by an electrical cable to an electrical sensing means which interprets the signal from the neutron counter in the center of the moderating spheres. The spherical shape of the device allows for accurate measurement of dose equivalents regardless of its positioning.

17 Claims, 1 Drawing Sheet

HIGH ENERGY NEUTRON DOSIMETER

The invention described herein was made with Government support under Contract No. DE-AC03-76SF00098 between the U.S. Department of Energy and the University of California for the operation of Lawrence Berkeley Laboratory. The Government has certain rights in this invention.

FIELD OF THE INVENTION

The present invention relates to device for measuring high energy neutron dose equivalents (the absorbed dose in tissues).

BACKGROUND OF THE INVENTION

A Dosimeter is a device that measures the absorbed dose in tissues (dose equivalents) from a radiation field in rem/n/cm$^2$. The present invention can be used for measuring energies from thermal to the gigaelectron volts (GeV) neutron range. The invention has numerous applications in nuclear science, high energy physics, reactor facilities, universities, hospitals, factories, environmental agencies, and military, defense and space research projects.

The most commonly used dosimeter for monitoring neutron dose equivalents is the Anderson-Braun (A-B) neutron detector. This type of dosimeter operates in the energy range from 0.025 electron volts (eV) to 14 megaelectron volts (MeV). The Anderson-Braun neutron detector is highly directional and its positioning may result in errors as large as 40% of the measurement.

Birattari et al. discuss some modifications to an A-B neutron detector to extend its range, ("An Extended Range Neutron REM Counter", *Nuclear Instruments and Methods in Physics Research*, Vol. A297, pp.250-257, 1990). While the modifications provide certain advantages, they do not serve to improve the device's directional sensitivity. This paper talks about a device with an upper limit of 400 MeV and which may become severely inaccurate depending upon its positioning within the radiation field. Finally, the article spells out that "it is apparent that this modified device will not be portable. It can either be thought of as a fixed instrument for ambient monitoring . . . or as a transportable survey meter to be moved around a facility by means of a trolley." Ibid. page 257.

Piesch, U.S. Pat. No. 4,588,898 issued May 13, 1986, uses a spherical moderator sphere as part of a neutron dosimeter. This device uses multiple neutron detectors, all but one of which is placed on the outside of the sphere. The neutron detector in the center of the sphere is not of a spherical shape. The moderating sphere is constructed of polyethylene and therefor its use is limited to moderating low energy neutrons. Polyethylene does not effectively moderate neutrons much above 5 MeV. The Piesch patent teaches the use of multiple detectors (three on the outside of the sphere and one in the center. Finally, Piesch claims an upper range of 10 MeV.

The limitation of current dosimeters, which do not measure neutron dose equivalents above about 15 MeV, is a serious problem at high energy accelerator facilities where monitoring the dose equivalent from highly energetic neutrons is important. Furthermore the directional dependency of most dosimeters may introduce substantial errors into measurements. The present invention represents a substantial advancement over prior radiation measurement art. It can measure dose equivalents above 1 GeV and does not lose accuracy because of positioning. Finally, the present invention is portable.

SUMMARY OF THE INVENTION

The present invention is a neutron dosimeter capable of measuring from thermal neutron to the GeV range without suffering a loss in accuracy due to directionality. This advancement is important for research into nuclear science and high-energy physics as well as other applications in which monitoring highly energetic neutrons is important.

It is an object of the present invention to provide a device for measuring the absorbed dose in tissues (dose equivalents) from a radiation field.

It is a further object of the present invention to provide a device for measuring dose equivalents from thermal neutron to the GeV range.

It is a further object of the present invention to provide an easily manufactured device capable of measuring dose equivalents into the GeV range.

It is a further object of the present invention to provide a portable device capable of measuring dose equivalents into the GeV range.

It is yet a further object of the present invention to provide a device for measuring dose equivalents that is not directionally sensitive.

The present invention is a device capable of measuring dose equivalents in the range of about 0.025 eV to 1 GeV. A spherically shaped neutron counter is positioned in the center of a moderating sphere made up of different layers of neutron moderating materials. A moderating material is one that reduces the energy level and thereby lowers the velocity of neutrons passing through it. The affect a particular material has on neutrons is dependent upon the initial velocity of the neutrons.

The primary (outermost) layer of the moderating sphere is comprised of two hemispheres of a low energy neutron moderating material. The secondary layer is comprised of two hemispheres of a high energy neutron moderating material. The tertiary layer is comprised of two hemispheres of a medium energy neutron moderating material. The spherically shaped neutron counter is held in place by means of a spacer.

An electrical sensing means is connected to the neutron detector through a set of holes passing through the different layers of the moderating sphere. This combination of layers of different moderating materials and a spherical shape result in a dosimeter which is capable of measuring dose equivalents beyond 1 GeV with minimal directional sensitivity.

In one preferred embodiment, the moderating spheres have a total diameter in the range of about 5.5 inches to 16.5 inches. A moderating sphere with a total diameter of about 11 inches has been found to be highly effective. The primary layer is made up of polyethylene having a thickness in the range of about 1.55 inches to 4.65 inches. A thickness of about 3.1 inches has been found to be highly effective. The secondary layer is made up of substantially pure lead having a thickness in the range of about 0.20 inches to 0.60 inches. A thickness of about 0.40 inches for the secondary layer has been found to be highly effective. The tertiary layer is made up of borated polyethylene having a thickness in the range of about 0.125 inches to 0.375 inches and with a boron content between 15% and 45% by weight. A thickness of about 0.250 inches and a boron content of about 30% by weight has been found to be highly effective. The tertiary layer also has a plurality of equally distributed holes covering between about 10% and 25% of the sphere. A plurality of holes equaling about 11.3% of the sphere has been found to be highly effective. The center of the dosimeter is comprised of a spherically shaped $BF_3$ neutron counter and a spacer that holds the $BF_3$ neutron counter in place and centers it with respect to the moderating spheres. There is an aperture passing through the moderating spheres that allow the $BF_3$ neutron counter to be connected to the electrical sensing means.

These and other objects and features of the invention will become more fully apparent when the following detailed description of the invention is read in conjunction with the accompanying drawing.

DETAILED DESCRIPTION OF THE INVENTION

Figure 1:
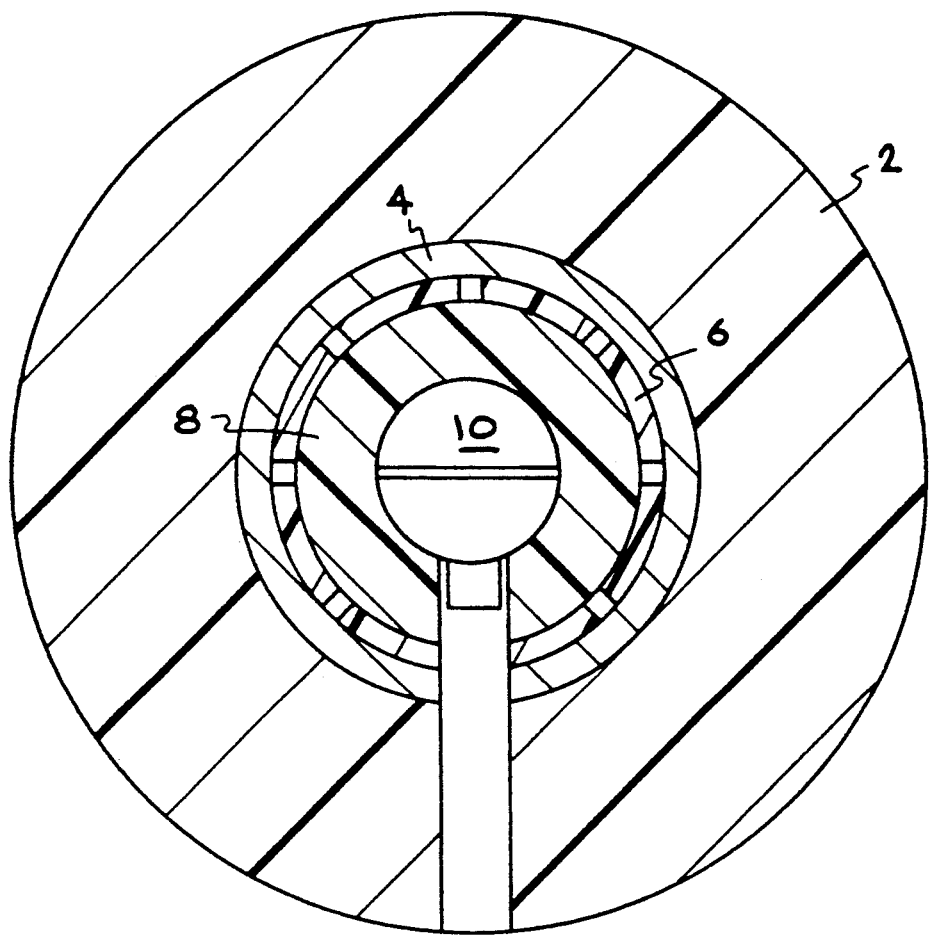
FIG. 1 shows a cross-sectional view of a spherical neutron dosimeter as described by the invention.

FIG. 1 shows the low energy neutron moderating sphere 2 that is comprised of two symmetrical hemispheres of polyethylene. The high energy neutron moderating sphere 4 is nested within the low energy neutron moderating sphere and is comprised of two symmetrical hemispheres of substantially pure lead. The medium energy neutron moderating sphere 6 is nested within the high energy neutron moderating sphere and is comprised of two symmetrical hemispheres of borated polyethylene with a plurality of equally distributed holes across their surfaces. The borated polyethylene has a boron content between 15% and 45% by weight. The holes cover between 10% and 25% of the surface area of the plastic and provide a means for varying the total density of the medium energy neutron moderating sphere. Varying the number of holes over the borated layer serves to adjust the dosimeter's sensitivity for thermal and epithermal neutrons. The optimal number of holes varies with the dimensions of the dosimeter which relates to calculating the relationship between the neutron radiation field strength and the electrical signal produced by the neutron counter. The exact dimensions and specifications of the device can be varied in order to perform different functions. A spacer 8 centers the $BF_3$ neutron counter 10 with respect to the moderating spheres.

Figure 2:
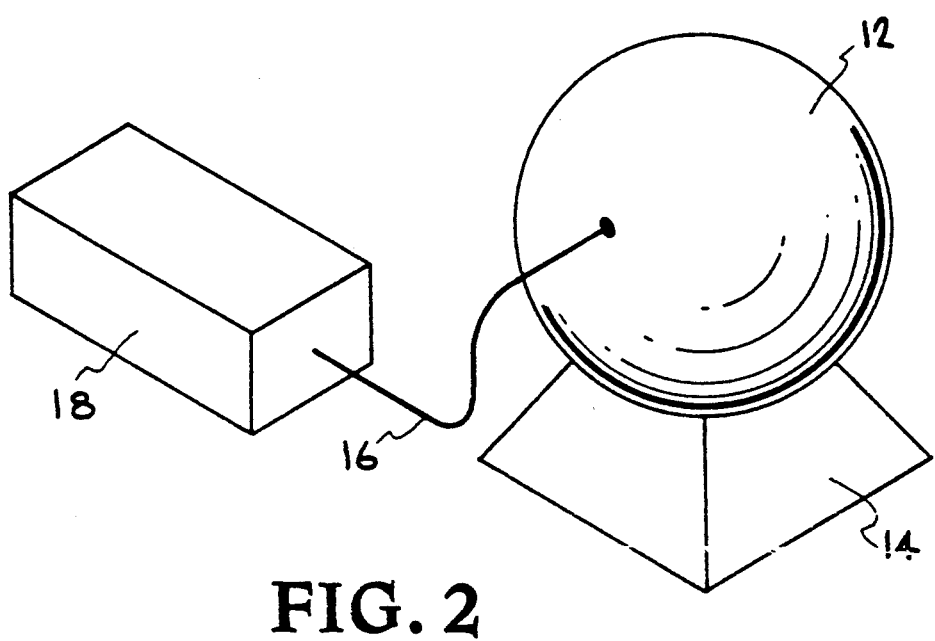
FIG. 2 shows a typical setup using the spherical neutron dosimeter as described by the invention.

FIG. 2 shows the spherical neutron dosimeter 12 as it is intended to be used. The dosimeter 12 is placed on a stand 14 or alternatively may be placed upon the floor. An electrical cable 16 connects the $BF_3$ neutron counter FIG. 1, 10 to the electrical sensing means FIG. 2, 18.

It will be recognized by those skilled in the art that this description may not be the only possible description, or the most accurate description of the theory of this device.

When a neutron strikes the low energy neutron moderating material the low energy neutrons are slowed down while the medium and high energy neutrons pass through virtually unaffected. Polyethylene was selected because it provides a relatively light weight nucleus to dissipate the low energy neutrons' velocity through elastic collisions. The high energy neutron moderating material slows down the high energy neutrons while having less of an effect on the medium energy neutrons and still less effect on the lower energy neutrons. Lead is a preferred material because of its low cost, its ease of use, and its heavy nucleus which will slow down the high energy neutrons through inelastic collisions.

The medium energy neutron moderating material slows down the medium energy neutrons while having less of an effect on the low energy neutrons. The high energy neutrons have by this point been reduced to medium or low energy neutrons. Borated Polyethylene is used because of its ease of manufacture and the fact that its nuclear weight is well suited for slowing down the medium energy neutrons which dissipate most of their energy through elastic collisions but which require something heavier than pure polyethylene.

After passing through the moderating spheres 2, 4 and 6, the neutrons have an energy level which will allow them to react with the $BF_3$ neutron counter 10. The number of neutrons allowed through the moderating spheres will depend upon the dimensions and compositions of the spheres. When a neutron reacts with the $BF_3$ a positron is created. The creation of positrons generates an electrical current that passes through the cable 16 to be measured by the electrical sensing, device 18. The correlation between the electrical current (signal) produced by the neutron/$BF_3$ reaction and the dose equivalent for the radiation field is determined by methods which are well known in the radiation measuring arts (*United States. National Bureau of Standards Handbook* 63, Prepared by the Subcommittee on Heavy Particles as part of the National Committee on Radiation Protection and Measurments, Washington D.C., U.S. Government Printing Office, 1957).

We claim:

1. A device capable of measuring neutron dose equivalents in the range of about 0.025 eV to 1 GeV which retains its accuracy regardless of position, said device comprising:
   a) a low energy neutron moderating sphere;
   b) a high energy neutron moderating sphere centrally disposed within said low energy neutron moderating sphere;
   c) a medium energy neutron moderating sphere centrally disposed within said high energy neutron moderating sphere;
   d) a neutron counter of a spherical shape centrally disposed within said medium energy neutron moderating sphere;
   e) a spacer situated between said neutron counter and said medium energy neutron moderating sphere whereby said neutron counter is centered with respect to the medium energy neutron moderating sphere;
   f) an electrical sensing means for measuring and recording data from said neutron counter and attached thereto.

2. The device as recited in claim 1, wherein the low energy neutron moderating sphere is comprised of two hollow hemispheres of polyethylene fastened at their perimeters and having an aperture allowing said neutron counter to be connected to the electrical sensing means.

3. The device as recited in claim 2, wherein the low energy neutron moderating sphere is between 5.5 and 16.5 inches in diameter and the hemispheres have a thickness of between 1.55 and 4.65 inches.

4. The device as recited in claim 3, wherein the low energy neutron moderating sphere has a diameter of about 11 inches and the hemispheres have a thickness of about 3.1 inches.

5. The device as recited in claim 1, wherein the high energy neutron moderating sphere is comprised of two hollow hemispheres of material containing lead and having an aperture allowing said neutron counter to be connected to the electrical sensing means.

6. The device as recited in claim 5, wherein the high energy neutron moderating sphere is between 2.4 and 7.2 inches in diameter and the hemispheres have a thickness of between 0.020 and 0.60 inches.

7. The device as recited in claim 6, wherein the high energy neutron moderating sphere has a diameter of about 4.80 inches and the hemispheres have a thickness of about 0.40 inches.

8. The device as recited in claim 5, wherein the high energy neutron moderating sphere is comprised of substantially pure lead.

9. The device as recited in claim 1 wherein the medium energy neutron moderating sphere is comprised of two hollow hemispheres of borated polyethylene having a plurality of equally distributed holes and an aperture allowing said neutron counter to be connected to the electrical sensing means.

10. The device as recited in claim 9, wherein the medium energy neutron moderating sphere has a diameter between 2 and 6 inches and the two hollow hemispheres of borated polyethylene have a thickness of between 0.125 an 0.375 inches.

11. The device as recited in claim 10, wherein the medium energy neutron moderating sphere has a diameter of about 4 inches and the hemispheres have a thickness of about 0.250 inches.

12. The device as recited in claim 9, wherein the medium energy neutron moderating sphere has a plurality of equally distributed holes covering between 10% and 25% of the borated polyethylene.

13. The device as recited in claim 12, wherein the medium energy neutron moderating sphere has a plurality of equally distributed holes covering about 11.3% of the borated polyethylene.

14. The device as recited in claim 9, wherein the medium energy neutron moderating sphere has a boron content between 15% and 45% by weight.

15. The device as recited in claim 14, wherein the medium energy neutron moderating sphere has a boron content of about 30% by weight.

16. The device as recited in claim 1, wherein the neutron counter is between 1 and 3 inches in diameter.

17. The device as recited in claim 1, wherein said spacer is of a material consisting substantially of polyethylene.

* * * * *